United States Patent
Adams et al.

(10) Patent No.: US 6,208,293 B1
(45) Date of Patent: Mar. 27, 2001

(54) PHOTONICALLY CONTROLLED, PHASED ARRAY ANTENNA

(75) Inventors: Stephen B. Adams, Mont Vernon, NH (US); Brian J. Edward, Pompey; Bryan L. Cleaveland, Baldwinsville, both of NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/193,888

(22) Filed: Nov. 18, 1998

Related U.S. Application Data

(60) Provisional application No. 60/066,738, filed on Nov. 21, 1997.

(51) Int. Cl.[7] .............................. H01Q 3/26; H01Q 3/02; H01Q 3/12; H01Q 3/22
(52) U.S. Cl. .......................... 342/368; 342/371; 342/374
(58) Field of Search ................................. 342/368, 371, 342/372, 374, 54; 343/721, 772

(56) References Cited

U.S. PATENT DOCUMENTS

| | | | |
|---|---|---|---|
| 4,782,346 | * 11/1988 | Sharma | 343/795 |
| 4,814,773 | 3/1989 | Wechsberg et al. | 342/368 |
| 5,222,162 | 6/1993 | Yap et al. | 385/14 |
| 5,374,935 | 12/1994 | Forrest | 342/368 |
| 5,761,351 | 6/1998 | Johnson | 385/15 |
| 5,926,148 | * 7/1999 | Liu et al. | 343/785 |

* cited by examiner

Primary Examiner—Thomas H. Tarcza
Assistant Examiner—Fred Mull
(74) Attorney, Agent, or Firm—Marsh Fischmann & Breyfogle LLP

(57) ABSTRACT

A photonically controlled antenna element made of a material such as silicon is disclosed wherein one or more of such antenna elements are mounted in an array on a light waveguide made of glass or sapphire. Light is injected into the light waveguide and reflects therein until it is absorbed by the antenna elements due to the higher refractive index of silicon which makes the reflection break down, and thus allows the laser beam to leak out of the waveguide into the silicon antenna elements. When the photonically controlled antenna elements are illuminated they are switched to a conductive state and can transmit and receive electromagnetic signals. When no light is injected into the light waveguide the photonically controlled antenna elements are not illuminated and are in a non-conductive state wherein they cannot receive or transmit electromagnetic signals. A number of these light waveguides with their antenna arrays thereon may be stacked together to form a single antenna system. When the antenna elements on each light waveguide are designed to operate at different frequencies an extremely broadband antenna system is the result. By providing appropriate time or phase delay to the signals going to each antenna array on a light waveguide a phased array antenna is the result with the ability to electronically steer the radiated electromagnetic signal. Different portions of the broadband antenna system may be operating at the same time, with some parts transmitting and other parts receiving electromagnetic energy.

20 Claims, 2 Drawing Sheets

PHOTONICALLY CONTROLLED, PHASED ARRAY ANTENNA

RELATED APPLICATION

This application claims the benefit of U.S. Provisional Patent Application No. 60/066,738, entitled "Photonically Controlled, Multi-Octave, Low-Profile Phased Antenna", filed on Nov. 21, 1997.

FIELD OF THE INVENTION

This invention relates to phased array antennas, and more particularly to antenna elements that are formed of photo-conductive materials which when illuminated become conductive so that they are enabled to function as a receiving and radiating element.

BACKGROUND OF THE INVENTION

In the prior art, photo-conductive antennas activated by laser pulses are known. The antenna elements are fabricated from a photo-conductive semiconductor material that becomes conductive when illuminated by a light source, such as a laser, and thus can serve as a metal-like electromagnetic radiator/receiver. When the laser source is turned off, the photo-conductive antenna elements becomes non-conductive. In the non-conductive state the antenna elements cannot transmit or receive electromagnetic waves. In this non-conductive state the antenna elements gives no interference to nearby active antenna elements and are also immune from electromagnetic detection.

To achieve multi-octave frequency coverage with a phased array antenna, multiple layers of planar antenna elements, with each layer dedicated to an octave bandwidth, have been taught to circumvent the problems associated with each antenna element having to cover the entire frequency spectrum. To prevent the formation of extraneous grating lobes at the highest frequency of antenna array operation, the radiating elements must be closely spaced. This restricts the physical size of the antenna array, and the apparatus for optically illuminating the photo-conductive, semiconductor, antenna elements, which in-turn limits its performance at the lower frequencies of operation.

These designs, however, are based on conventional metallic conductor elements and the interaction between the layers proves detrimental to performance. Array designs have also been taught which place portions of metallic conductors on a substrate and interconnect these portions to form a dipole or patch radiator resonant at the frequency of operation. The interconnect function can be performed by an optically controlled switch. Such dipoles or patches, however, are inherently narrow in bandwidth. A departure in operating frequency by more than a few percent requires altering the switch states. Wide instantaneous bandwidth operation is unachievable, and such antenna elements provide interference to other nearby antenna elements in the array.

Thus, there is a need in the art for an antenna that can be used in a phased array without interfering with other nearby antennas in the array, while at the same time being extremely broadband. There is also a need for means to switch a photo-conductive antennas between its conductive and non-conductive states that is small and permits the assembly of an antenna array.

SUMMARY OF THE INVENTION

The foregoing needs of the prior art are satisfied by the present invention. A small, extremely broadband array of antenna elements is disclosed wherein individual antenna elements do not substantially interfere with other antenna elements in the array. A small optical switch is also disclosed which is used to selectively illuminate photo-conductive antenna elements to switch them between their conductive and non-conductive states.

The antenna elements are fabricated from a photo-conductive semiconductor material, such as silicon, that becomes conductive when illuminated by a light source and thus can serve as a metal-like electromagnetic antenna. A novel, small, light waveguide is taught which is used to mount the photo-conductive antenna elements and is also used to selectively illuminate and switch the antenna elements between their conductive and non-conductive states. The photo-conductive antenna elements mounted on the light waveguides form antenna array panels, and multiple panels can be stacked in a compact manner, and shared with a common exposure aperture. Each antenna array panel is designed to operate at a certain bandwidth section as a part of the total broad bandwidth of the system. The whole array of antenna elements offers a broad bandwidth capability, while retaining the advantages of a narrow bandwidth performance.

In addition, the antenna element array panels can be stacked very compactly which reduces side lobes; permits sharing of the exposure area/radome, dramatically reduces the system space-extension requirement, and decreases the radar signature. In accordance with the teaching of the invention the stacked antenna element array panels are mounted parallel to the radome and a ground plane.

The photo-conductive, silicon antenna elements on each antenna array panel are illuminated using a light waveguide, or optical tank, selectively fed with continuous wave laser light which provides uniform and efficient illumination of the antenna elements mounted on the array panel. The light tank waveguide is a thin slab of glass or sapphire with dielectric coated edges providing a mirror action to laser light in the substrate, and on which the photo-conductive semiconductor antenna elements are mounted. Laser illumination is delivered to the glass or sapphire by optical fibers and, due to reflection from the RF compatible, dielectric coated edges, the laser beam injected inside the optical tank reflects therein with little loss until absorbed by the photo-conductive, silicon, antenna elements.

With the photo-conductive silicon antenna elements bonded to the surface of the light waveguide, the higher refractive index of silicon makes the total reflection therein break down, and thus allows the laser beam to leak through the surface of the waveguide into the silicon antenna elements. When this occurs the silicon antenna elements becomes conductive and functions as a metallic antenna to receive and radiate electromagnetic energy. When illumination is removed from a light waveguide, the antenna elements thereon become non-conductive, appear as insulators, are electrically transparent to electromagnetic energy being transmitted by the antennas of other array panels, and thus give no interference to nearby active antenna elements.

With each antenna array panel designed to operate over an octave bandwidth, and by stacking multiple antenna array panels with each panel designed to operate over a different octave bandwidth, an extremely wide bandwidth antenna array is achieved. By phasing the signals applied to the antenna elements, phased array operation is achieved and the main lobe of the antenna elements can be electronically steered.

DESCRIPTION OF THE DRAWING

The invention will be better understood upon reading the following Detailed Description in conjunction with the drawing is which.

DETAILED DESCRIPTION

Figure 1:
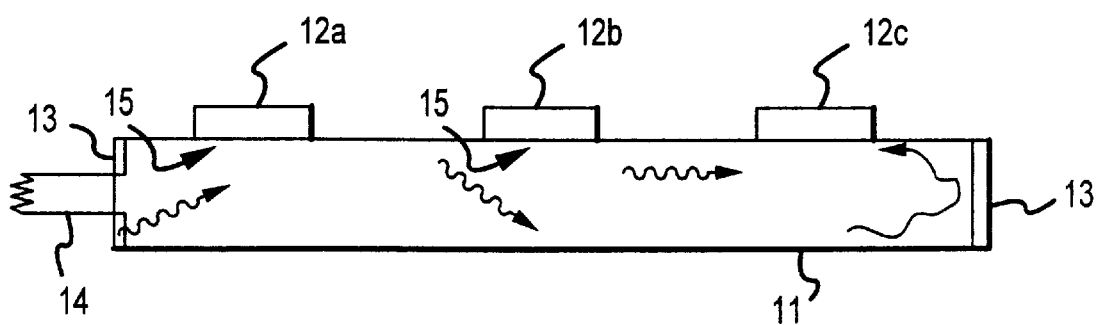
FIG. 1 shows a simplified side view of a glass substrate light waveguide with photo-conductive, silicon antenna elements thereon and how light injected into the light waveguide is reflected until absorbed by the antenna elements.

In FIG. 1 is shown a simplified side view of a light waveguide 11 that is part of an antenna array. Light waveguide 11 has photo-conductive antenna elements 12a, 12b and 12c mounted on its surface. Typically, however, there would be more than three antenna elements 12. The antenna elements 12a, 12b and 12c are made of a photo-conductive material, such as silicon and they are bow tie antennas. The antenna elements 12a, 12b and 12c are attached to a thin glass or sapphire sheet 11 the edges 13 of which are coated with a layer of a material, in a manner well known in the art, to make them reflective. To attach antenna elements 12a, 12b and 12c to glass or sapphire sheet 13 an optical cement of types known in the art is used.

The thin glass or sapphire sheet 11 makes up a light waveguide that is used to couple light energy to photo-conductive silicon antenna elements 12a, 12b and 12c to switch them between their conducting and non-conducting states in accordance with the teaching of the present invention. When photo-conductive silicon antenna elements 12a, 12b and 12c are illuminated, electron/hole pairs are created and the silicon behaves as a conductor. In this manner antenna elements 12a, 12b and 12c are switched to their on or conducting state wherein they can receive and transmit electromagnetic energy. When light energy is removed from thin glass or sapphire sheet, light waveguide 11, silicon antenna elements 12a, 12b and 12c are in their non-conducting state, appear as insulators, are electrically transparent, and thus give no interference to nearby active antenna elements 12.

To perform this function of switching antenna elements 12a, 12b and 12c between their conducting and non-conducting states, light is applied to the photo-conductive, silicon antenna elements using a light waveguide 11 which is a thin glass or sapphire sheet 11. Light energy for this purpose is obtained from a laser source, not shown, and is applied to one end of light waveguide 11 with optical fibers as shown. The front and back edges 13 of light waveguide 11 are coated with a dielectric material, in a manner well known in the art, to make them reflective. Thus, light waveguide 11 is an optical cavity. The light energy from the laser is carried via optical fibers 14, the terminating end of which are abutted against one end of light waveguide 11. Multiple optical fibers 14 are used, spaced along the end of light waveguide 11, to insure uniform and efficient injection of light into the waveguide. The dimensions of the light tank for the 1.5–3.5 GHz silicon bowtie antenna are 2.5×5 cm(1×2 inches) with the thickness of about 1 mm (0.04 in).

The laser light injected into light waveguide 11 is reflected therein until the light is absorbed by antenna elements 12a, 12b and 12c. Optical switches (not shown) are used to apply and remove laser light to optical fibers 14 in a manner well known in the art.

As the light energy transverses the optical cavity of light waveguide 11, the higher refractive index of silicon antenna elements 12a, 12b and 12c makes the total reflection break down, and allows the light energy to leak out of light waveguide 11 into silicon antenna elements 12a, 12b and 12c. When illuminated by the escaping light energy the silicon antenna elements 12a, 12b and 12c become electrically conductive. To improve absorption of light by silicon antenna elements 12a, 12b and 12c, a metal film or frosting (not shown), such as gold or aluminum, may be added at the junction 15 of the antenna elements and light waveguide 11. In this manner lower levels of optical energy need be input to light waveguide 11 to activate antenna elements 12a, 12b and 12c to their conductive states. As is known in the art the electromagnetic energy radiated from these antenna elements has a toroid pattern and radiates horizontally and perpendicular to light waveguide 11.

Figure 2:
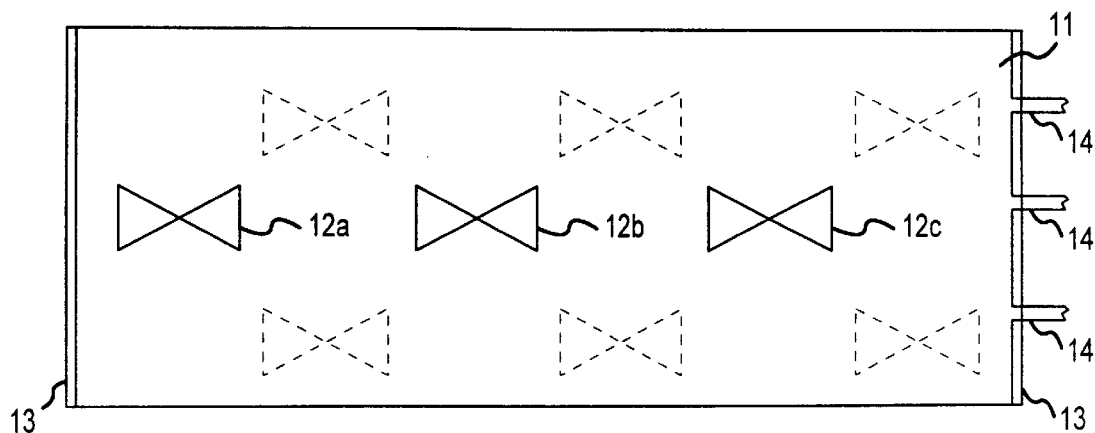
FIG. 2 shows a front view of a plurality of photo-conductive, silicon antenna elements on a single light waveguide, and in relationship to other antenna elements in a stack of light waveguides.
Figure 3:
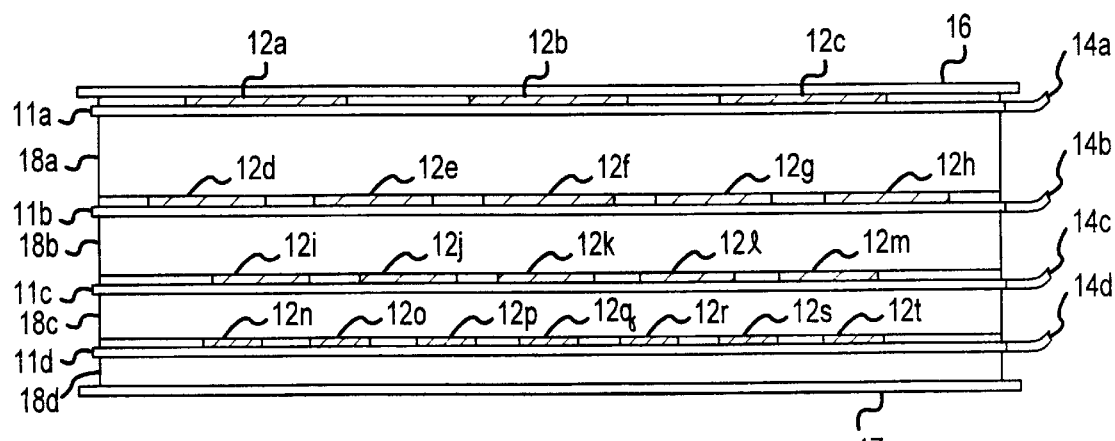
FIG. 3 shows a side view of a stack of individual light waveguides making up a broadband antenna where the light waveguides are parallel to a radome.

FIG. 2 shows a front view of a plurality of photo-conductive, silicon antenna elements 12a, 12b and 12c on a single light waveguide 11. The antenna elements 12 shown in this Figure are all bow tie which are each connected to a compensated balun feed (not shown in this Figure) fabricated using conventionally metallic conductors and soldered thereto using indium at the contact tip of each triangle at the middle, narrow point of the bow tie antenna. The bowtie antennas are fabricated from standard 10.2 cm (4 inch) diameter wafers with a thickness of 0.64 mm (0.025 in). While only three representative antenna elements 12a, 12b and 12c are shown in FIG. 2, there would actually be many antenna elements on a single light waveguide 11. In addition, this Figure is not drawn to scale for ease of presentation, and the antenna elements 12 are really much smaller and spaced closer together. Using signal time/phase delay and switching techniques, not shown but well known in the phased array antenna art, a common signal is applied to antenna elements 12a, 12b and 12c with phase differences which are used to electronically steer the direction in which the main lobe of the antenna array will transmit. When more than one light waveguide 11 are stacked together to create a broadband antenna, as shown in FIG. 3 and described with reference to that Figure, the antenna elements are offset from each other. In FIG. 2 antenna elements on other light waveguides below top waveguide 11 are shown in dotted line form. The dotted line antennas are physically offset from antenna elements 12a, 12b and 12c, as shown, to better facilitate transmission and reception of electromagnetic signals.

With the antenna elements 12a, 12b and 12c on each optical waveguide 11 layer being designed to operate over a different, adjacent band of approximately an octave frequency range, the entire stack of optical waveguide 11 layers implements a low-profile, extremely broadband, phased array antenna capable of multi-octave frequency coverage.

In FIG. 3 is shown a side view of a broadband antenna comprised of four optical waveguide layers 11a, 11b, 11c and 11d stacked together utilizing the teaching of the present invention. In this Figure the stacked optical waveguides 11a, 11b, 11c and 11d are oriented parallel to the radome 16.

As mentioned hereinabove, the energy pattern radiated from antenna elements 12 is both perpendicular and horizontal to the plane of light waveguides 11 as is well known in the antenna art. In this configuration of the stacked waveguides it is the energy radiated perpendicular to light waveguides 11 and radome 16 that is of interest. To facilitate radiating energy in this direction ground plane 17 is used to reflect the rear radiation lobe in a manner that is well known in the art.

The front of the antenna array is in the direction of radome 16 which serves a function well known in the antenna art. Layer 11a is designed to cover the frequency band from 1–2 Gigahertz, layer 11b is designed to cover the frequency band from 2–4 Gigahertz, layer 11c is designed to cover the frequency band from 4–8 Gigahertz, and layer 11d is designed to cover the frequency band from 8–16 Gigahertz. At the 1–2 Gigahertz band the wavelength is longest and, accordingly, the size of the antenna elements on that layer are largest, and spaced furthest from each other, as shown. Conversely, at the 8–16 Gigahertz band the wavelength is shortest and, accordingly, the size of the antenna elements on that layer are smallest, and spaced closest to each other, as shown.

The spacing between optical waveguide layers 11a, 11b, 11c and 11d and ground plane 17 in FIG. 3 is also on the wavelength. Each of optical waveguides 11a, 11b, 11c and 11d are spaced a quarter wave length from ground plane 17 at the center of their operating frequency band for reasons well known in the art to reflect rear radiation lobes. Dielectric material is placed in layers 18a, 18b, 18c and 18d to set these quarter wavelength spacings. Reflective material on the sides of optical waveguide layers 11a, 11b, 11c and 11d are not shown to avoid cluttering up the Figure.

Optical waveguide layer 11a is driven by laser light from optical fiber 14a, optical waveguide layer 11b is driven by laser light from optical fiber 14b, optical waveguide layer 11c is driven by laser light from optical fiber 14c, and optical waveguide layer 11d is driven by laser light from optical fiber 14d. Also shown in FIG. 3 is one representative balun feed to antenna element 12a. The balun feeds to the other antenna elements 12d–12t are not shown to avoid cluttering the Figure.

Partitioning the full frequency range into octave band layers permits simultaneously satisfying two competing requirements. Within each optical waveguide 11a–11d the antenna elements 12a–12c, 12d–12h, 12i–12m, and 12n–12t must be located sufficiently close together to support phased array beam steering without the formation of extraneous grating lobes. This antenna spacing requirement is established for the upper frequency extreme of a band. In contrast, sufficient area must also be allocated for each antenna element 12 so that they operate properly at the lowest frequency extreme of that band. Spacing individual ones of the antennas on a triangular grid of 0.62 wavelengths at the upper frequency provides for beam scan to 60° from array broadside. Octave coverage bands will then yield 0.31 wavelength element spacing, at the lower frequency extreme, sufficient to realize adequate radiation properties and impedance behavior when using an antenna design such as the bow tie antenna illustrated in FIG. 2. The multiple layer design of the antenna array shown in FIG. 3 also allows spacing individual antenna elements an ideal electrical quarter wavelength, at the bands center frequencies, above a common array ground plane 17.

Because this novel phased array design features a multi-octave operating bandwidth and an instantaneous bandwidth on the order of an octave, it can support short pulse/wide bandwidth radar waveforms for target discrimination, frequency agility for low probability of intercept radar and communication operations, and the large frequency spreads required for electronic surveillance/electronic warfare functions. The phased array is also dynamically reconfigurable. An arbitrary size portion of the antenna array can be selected for a desired function at the appropriate frequency span, while the remainder of the array can be independently operating at a different frequency in a time sharing fashion.

The percent of the array allocated to a function can be altered at will. In addition, the layered design also features a low-profile which can conform to complex shapes, such the surface of an aircraft. For aircraft deployment this means the antenna array can be accommodated at various sites on the airframe. Further, when the phased array is not being used, all the radiating elements may be made transparent to electromagnetic waves. This enables the achievement of a low radar cross-section.

While what has been disclosed herein is the preferred embodiment of the invention numerous changes may be made without departing from the spirit and scope of the invention. For instance the individual antennas may be fabricated from photo-conductive materials other than silicon, and antennas other than bow tie antennas may be used.

What is claimed is:

1. A photonically controlled antenna comprising:
   a light waveguide;
   at least one photonically controlled antenna element bonded to the surface of said light waveguide;
   means for applying light energy to said light waveguide, said light energy being reflected in said light waveguide until being absorbed by said at least one photonically controlled antenna element through the surface of said light waveguide; and
   wherein said at least one photonically controlled antenna element is switched to a conductive state wherein it can transmit and receive electromagnetic energy when said light energy is applied to said light waveguide by said applying means, and said at least one photonically controlled antenna element is switched to a non-conductive state wherein it cannot transmit and receive electromagnetic energy when said light energy is removed from said light waveguide by said applying means.

2. The invention in accordance with claim 1 wherein said light waveguide comprises a piece of light conductive material such as glass or sapphire on one surface of which said at least one photonically controlled antenna is bonded.

3. The invention in accordance with claim 2 wherein said light waveguide further comprises reflection means placed on other surfaces of said light waveguide to assist in reflecting light within said light waveguide by said light energy applying means until said light is absorbed by said photonically controlled antenna element through the surface of said light waveguide.

4. The invention in accordance with claim 3 further comprising means for facilitating the transfer of light energy reflecting inside said light waveguide to said photonically controlled antenna elements so that said photonically controlled antenna elements can change to its conducting state when illuminated by a lesser amount of light energy in said light waveguide.

5. The invention in accordance with claim 4 further comprising a plurality of said light waveguides all stacked together next to each other to create an antenna array, and different ones of said light waveguides are designed to operate over different frequency ranges, said plurality of light waveguides thereby making up an extremely broadband antenna.

6. The invention in accordance with claim 5 wherein each of said light waveguides has a plurality of photonically controlled antenna elements bonded to its surface to create an array of antenna elements on each of said light waveguides.

7. The invention in accordance with claim 6 wherein a signal is applied to said photonically controlled antenna elements on each of said light waveguides to be transmitted, and the portion of said last mentioned signal applied to ones of said last mentioned photonically controlled antenna elements are delayed in time or phase so that they cooperate as a phased array antenna that can electronically steer the direction in which said last mentioned signal is radiated as electromagnetic energy.

8. The invention in accordance with claim 7 wherein ones of said stacked plurality of light waveguides can operating independently of others of said stacked plurality of light waveguides, so some photonically controlled antenna elements can be transmitting signals while other photonically controlled antenna elements are receiving signals, and those antennas that are transmitting signals can be transmitting different signals and in different directions.

9. A photonically controlled antenna, comprising:
a light waveguide which comprises a light conductive material;
and a plurality of photonically controlled antenna elements mounted on said light waveguide, wherein each said photonically controlled antenna element is switchable to a conductive state by application of light energy to said light waveguide so as to be able to transmit and receive electromagnetic energy, and wherein each said photonically controlled antenna element is switchable to a non-conductive state by a discontinuation of said application of light energy to said light waveguide so as to be unable to transmit and receive electromagnetic energy.

10. The invention in accordance with claim 9, further comprising means for applying light energy to said light waveguide, wherein said light energy is reflected in said light waveguide until being absorbed by said plurality of photonically controlled antenna elements through the surface of said light waveguide.

11. The invention in accordance with claim 10, further comprising reflection means placed on surfaces of said light waveguide to assist in reflecting light within said light waveguide provided by said light energy applying means until said light is absorbed by said plurality of photonically controlled antenna elements through the surface of said light waveguide.

12. The invention in accordance with claim 10, further comprising means for facilitating the transfer of light energy reflecting inside said light waveguide to said plurality of photonically controlled antenna elements so that said plurality of photonically controlled antenna elements can change to their conducting state when illuminated by a lesser amount of light energy in said light waveguide of photonically.

13. The invention in accordance with claim 9, wherein each of said plurality controlled antenna elements comprises a semiconductor material.

14. The invention in accordance with claim 9 wherein a signal is applied to said photonically controlled antenna elements on said light waveguide to be transmitted, and the portion of said last mentioned signal applied to ones of said last mentioned photonically controlled antenna elements are delayed in time or phase so that they cooperate as a phased array antenna that can electronically steer the direction in which said last mentioned signal is radiated as electromagnetic energy.

15. The invention in accordance with claim 9, further comprising a plurality of said light waveguides stacked together next to each other in spaced relation and each having a plurality of said photonically controlled antenna elements mounted thereon, wherein said photonically controlled antenna elements on different ones of said light waveguides are designed to operate over different frequency ranges, said plurality of light waveguides with said plurality of photonically controlled elements mounted thereon thereby making up a broadband antenna.

16. The invention in accordance with claim 15, wherein ones of said stacked plurality of light waveguides can operate independently of others of said stacked plurality of light waveguides, so some of said plurality of photonically controlled antenna elements can be transmitting signals while others of said plurality of photonically controlled antenna elements are receiving signals, and those of said plurality of photonically controlled antenna elements that are transmitting signals can be transmitting different signals and in different directions.

17. A method for enabling and disabling a photonically controlled antenna element, said method comprising the steps of:
placing the photonically controlled antenna element on a light waveguide;
selectively injecting light energy into the light waveguide, the light energy reflecting inside the light waveguide until it is absorbed by the photonically controlled antenna element thereon, wherein the photonically controlled antenna element is switched to a conductive state wherein it can transmit and receive electromagnetic energy when the light energy is applied to the light waveguide, and wherein the photonically controlled antenna element is switched to a non-conductive state wherein it cannot transmit and receive electromagnetic energy when the light energy is removed from the light waveguide.

18. The invention in accordance with claim 9, wherein said light waveguide provides a common mount for said plurality of photonically controlled antenna elements, wherein said light waveguide is formed from a material selected from the group consisting of glass and sapphire, and wherein each of said plurality of photonically controlled antenna elements is formed from a semiconductor material.

19. The invention in accordance with claim 9, wherein said light waveguide comprises a first surface which extends between first and second edge surfaces, wherein said plurality of photonically controlled antenna elements are mounted on said first surface of said light waveguide, wherein said antenna further comprises a light source that is operatively interconnected with said first edge surface of said light waveguide, and wherein at least one of said first and second edge surfaces comprise a reflective material.

20. The invention in accordance with claim 19, wherein each of said first and second edge surfaces comprise a reflective material.

* * * * *

UNITED STATES PATENT AND TRADEMARK OFFICE
CERTIFICATE OF CORRECTION

PATENT NO.    : 6,208,293 B1
DATED         : March 27, 2001
INVENTOR(S)   : Adams et al.

It is certified that error appears in the above-identified patent and that said Letters Patent is hereby corrected as shown below:

<u>Column 7,</u>
Line 20, after the ";", insert therefor -- and --;
Line 21, delete "and";
Lines 51 and 52, delete "of photonically";
Line 54, after "plurality", insert therefor -- of photonically --.

Signed and Sealed this

Eleventh Day of September, 2001

*Attest:*

*Attesting Officer*

NICHOLAS P. GODICI
*Acting Director of the United States Patent and Trademark Office*